INVENTORS
Cyrus F. Wood
Carl L. Sadler
ATTORNEY

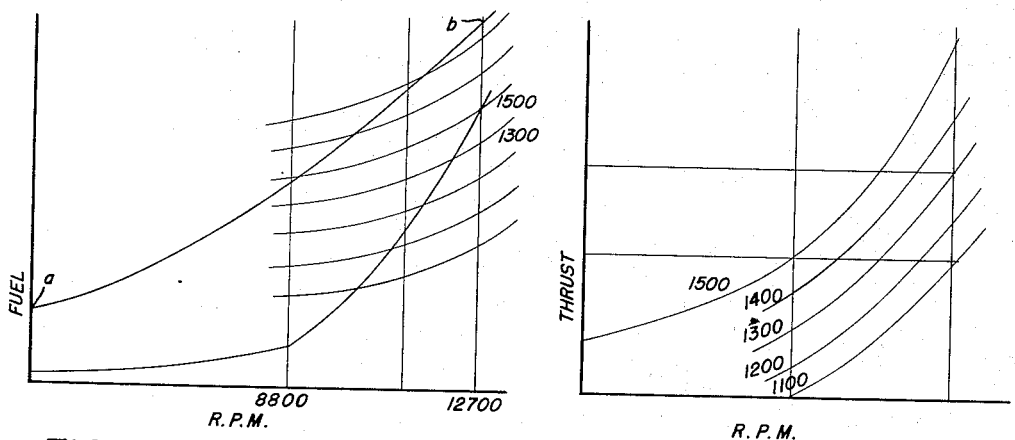
FIG. 2. FIG. 3.
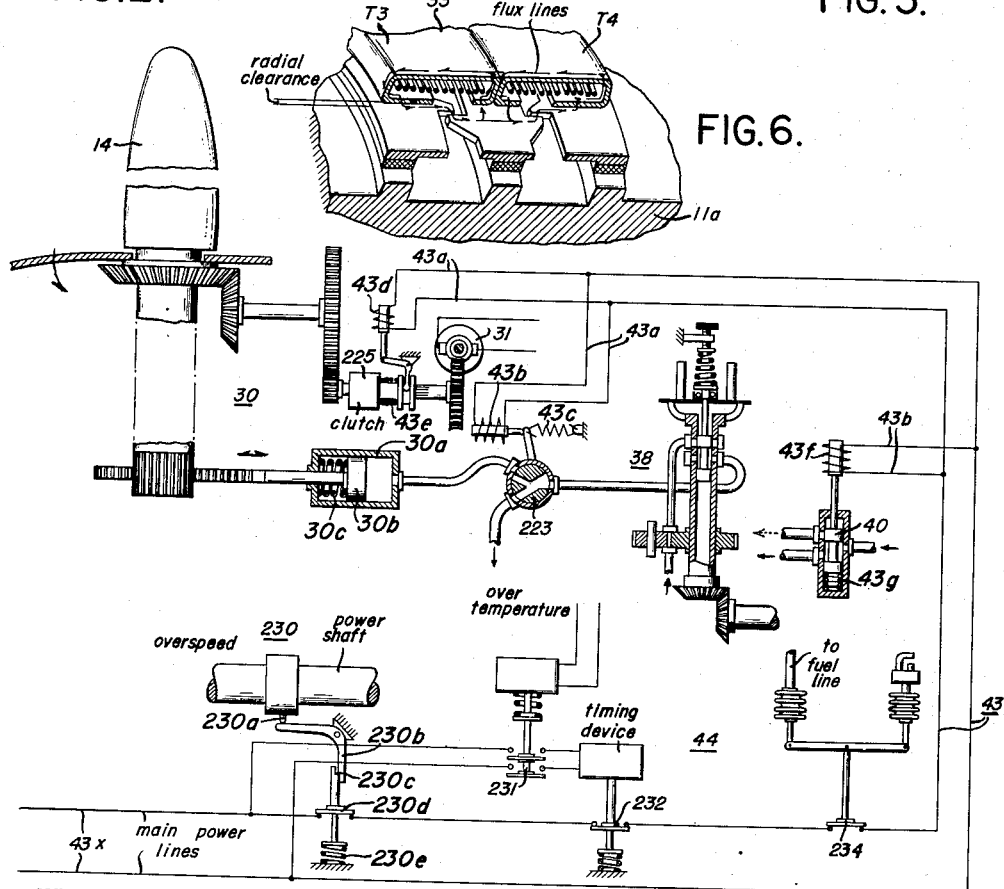
FIG. 6.
FIG. 11.

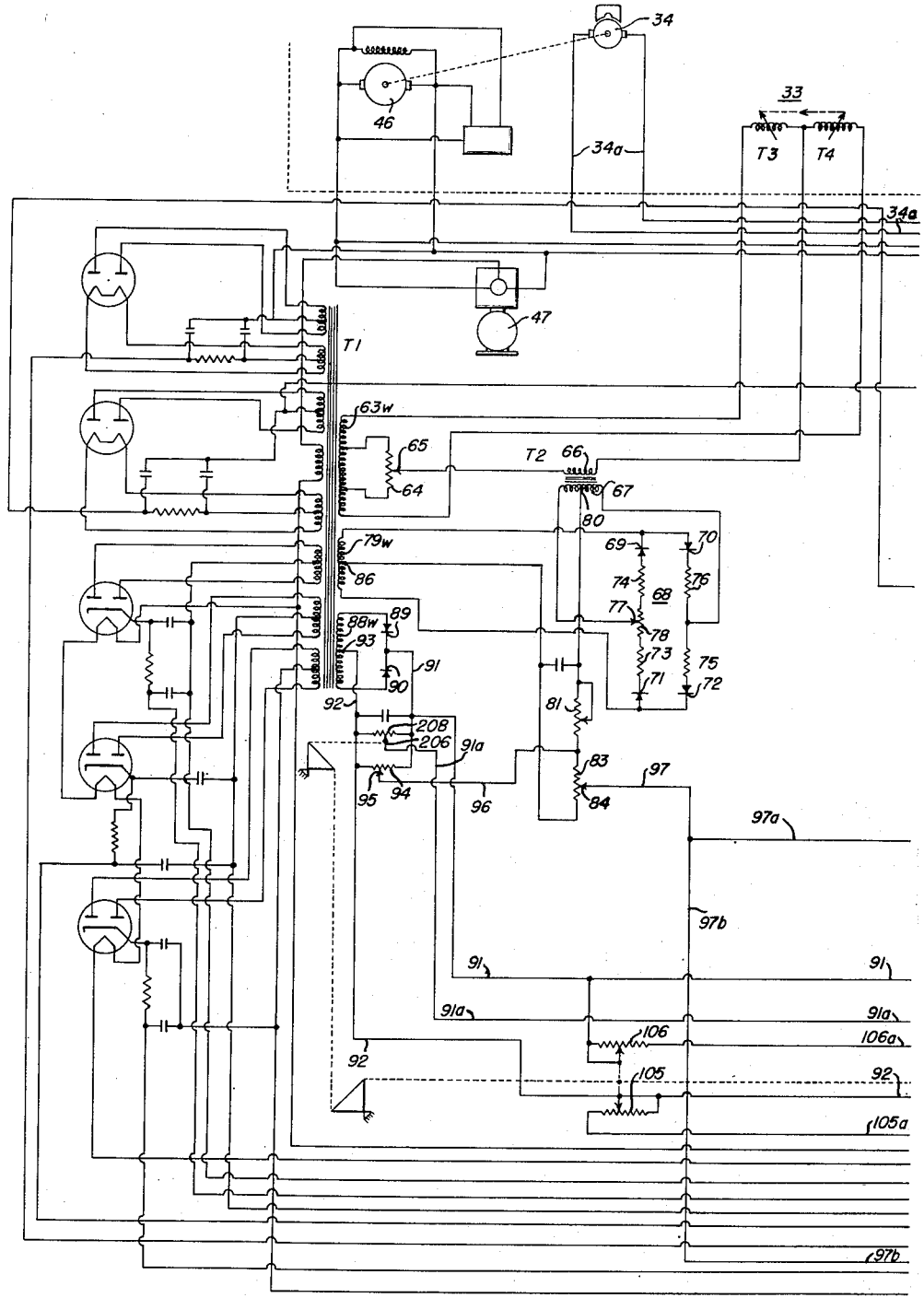
FIG.4.a.

Jan. 26, 1954 — C. F. WOOD ET AL — 2,667,228
AIRCRAFT FUEL AND PROPELLER PITCH CONTROL
Filed Feb. 24, 1949

INVENTORS
Cyrus F. Wood
Carl L. Sadler
ATTORNEY

Patented Jan. 26, 1954

2,667,228

UNITED STATES PATENT OFFICE 2,667,228

AIRCRAFT FUEL AND PROPELLER PITCH CONTROL

Cyrus F. Wood, Swarthmore, Pa., and Carl L. Sadler, Jr., Rockford, Ill., assignors, by mesne assignments, to the United States of America as represented by the Secretary of the Navy Application February 24, 1949, Serial No. 78,162

3 Claims. (Cl. 170—135.72)

The invention relates to propulsion plants, more particularly for aircraft, wherein a variable pitch propeller is driven by a turbine which drives a compressor furnishing air to support combustion of fluid fuel and to admix with the products of combustion to form a gaseous motive fluid for driving the turbine, and it has for an object to control operation thereof by varying the input of fuel and the propeller pitch by means of a system which is adjustable manually and which is responsive to torque of the driving connection between the turbine and the propeller to control the power delivered by the turbine to the propeller.

A further object of the invention is to provide fuel control and pitch control motors controlled by means of an electrical network receiving electrical inputs dependent upon operating characteristics, such as torque, temperature and speed, the arrangement being such that changes in the operating characteristics unbalance the network for operation of the motors to change the fuel input and propeller pitch until the network is rebalanced.

Another object of the invention is to provide fuel and pitch control servo-motors controlled by electronic means responsive to an electrical network receiving torque, temperature and speed inputs and having torque, temperature and speed settings.

A further object of the invention is to provide a gas turbine driving a variable pitch propeller through gearing together with means responsive to torque of the driving connection between the turbine and the propeller to control the flow of fuel to the turbine and the propeller pitch to avoid overloading the gearing.

A further object of the invention is to provide a controlling system of the above character, wherein in addition to torque, control is also effected in response to speed.

Another and more particular object of the invention is to provide an apparatus of the above character controlled in response to torque of the driving connection between the turbine and the propeller, in response to turbine speed, and in response to turbine temperature.

Variable pitch propellers are used with aircraft to provide for variation in engine power and flight speed without substantial change in engine speed by varying the fuel input and propeller pitch. In the ordinary arrangement, a governor controls the propeller pitch in response to a small range of speed change and the input of fuel is controlled manually. Thus, change in fuel input is accompanied by change in propeller pitch to change the propeller thrust for operation of the engine over its power range at its most economical speed.

To provide for proper operation of an aircraft propulsion plant wherein a gas turbine drives a variable and reversible pitch propeller, the control should be fast and accurate. While, as above suggested, the propeller pitch could be controlled in response to engine speed and while the flow of fuel could be controlled in response to turbine temperature and torque, such an arrangement would not be satisfactory for proper operation during starting or when operating with reversed propeller pitch. Although, these difficulties are met by having the propeller pitch controlled in response to temperature or torque or both temperature and torque and by having the fuel flow controlled in response to engine speed, such a system would not be sufficiently stable; and, to provide for stability, in accordance with the present invention, the torquemeter is connected to control both the fuel flow and propeller pitch. As torque acts ahead of temperature, it serves to stabilize both the temperature control and the speed control.

The control of a gas turbine plant driving a propeller is not only complicated by temperature, speed and compressor limitations, but, as rotating elements of the plant are connected together positively, it is important to provide a control arrangement taking into account these limitations and which shall achieve its purpose with stability. To provide for stability, the improved control arrangement quickly senses any change in power by being responsive to torque. If control of fuel flow were entirely in response to speed, then the inherent time delay would be such that, with other factors of control and all rotating parts of the plant mechanically connected together, poor stability would be a serious difficulty. As the power may be increased with change in either or both speed and temperature, it will be apparent that the same power may be developed at several different combinations of these factors, and it is desirable to provide for power development at the rotational speed and temperature giving an optimum fuel rate; however, in increasing the fuel rate to increase power and rotative speed, an increase in fuel rate in relation to rotative speed large enough to stall or choke the compressor should be avoided. Hence, in addition to the control of the input of fuel in response to torque, speed and temperature, these factors are used to control the propeller pitch to assure of a good relation of fuel rate, speed and temperature providing good performance without stalling the compressor.

With a gas turbine plant driving an aircraft propeller, not only must the temperature be kept within safe limits for the structural materials used, but power should be delivered to the propeller with the turbine operating at such speed and temperature that the compressor stall limit is not exceeded. Therefore, in accordance with the present invention, fuel control and pitch control motors are energized by means of a system subject to torque, speed and temperature control and provided with manually-operated torque, speed and temperature settings. Control is primarily in response to torque, with the speed and temperature outputs exerting supplementary or corrective effects, or the controlling outputs being added algebraically, so that power will be delivered to the propeller at the speed required for the torque and without the temperature exceeding the stall limit. In this connection, as the propeller pitch is variable, it will be apparent that, for the same power, torque and speed may vary relatively, the torque increasing as the speed decreases and vice versa; and, as control of temperature depends upon speed, it will be apparent that the regulating system may be adjusted to vary the power delivered by the turbine to the propeller, the torque, speed and temperature controls working to secure a steady state condition of the system for each change in power and with the temperature control also operating to limit the fuel input in relation to turbine speed to give over-temperature protection. Furthermore, as fuel flow is controlled in response to speed, provision is readily made for propeller pitch reversal. Aside from this interrelation of torque, temperature and speed controls, each is provided with settings and all of the settings are controlled by manual means operative from the cockpit. Accordingly, a further object is to provide apparatus of this character having these advantageous features.

Another object of the invention is to provide apparatus of the above character wherein fuel flow is controlled in response to torque to promote stability.

A further object of the invention is to provide apparatus of the character aforesaid wherein the fuel flow is controlled by turbine speed to aid in starting and reversing the propeller.

A further object of the invention is to provide, for a variable and reversible pitch propeller, a main controlling system of the above character wherein the manually-operable setting or adjusting means is operative to isolate the pitch control motor from control in response to torque, speed and temperature and to subject it to manual control for operation over the reverse pitch range.

A further object of the invention is to provide a controlling system of the character just described for a variable and reversible pitch propeller with means responsive to flight velocity to prevent reversal of pitch and adjustment of the propeller over the reverse pitch range if the flight velocity exceeds a predetermined amount.

A further object of the invention is to provide a plant of the above character wherein the amount of the change in the flow of fuel and pitch of the propeller, in response to changes in temperature, rotational speed, or torque of the driving connection between the turbine and the propeller, is varied in response to altitude and flight velocity.

Still another object of the invention is to provide a plant of the above character regulated with respect to torque, speed and temperature and wherein provision is made for over-temperature protection.

While control of fuel and pitch in response to torque, speed and temperature may be accomplished mechanically, we prefer to use an electrical regulating system for this purpose for the reason that a thermocouple provides an electrical output, a torquemeter of the magnetic strain gauge type serves the present purpose very satisfactorily and has an electrical output, and an electric tachometer may be used and which provides an electrical output. The regulating system embodies a network supplied with torque, temperature and speed electrical inputs to develop an output controlling the flow of fuel for operation of the turbine and controlling the propeller pitch to control the power delivered from the turbine to the propeller. The torque and speed inputs control the torque and speed for the power delivered by the turbine to the propeller and the temperature input provides for control at a favorable fuel rate with maintenance of a speed and temperature relation so as to avoid stalling of the compressor. Such an arrangement readily provides for raising and lowering of torque, temperature and speed in proper relation, control in response to altitude and flight velocity, avoidance of reversing the propeller pitch if the flight velocity exceeds a predetermined amount, relative adjustment for stability and proper operating relation, and ready changeover from the main control system to the emergency control system in response to emergency operating conditions. Accordingly, a more particular object of the invention is to provide a torquemeter, a tachometer, and thermocouple means furnishing electrical outputs to an electronic system controlling energization of fuel control and pitch control motors, the system including torque, speed and temperature settings which are manually adjustable for variation in power delivered to the propeller as above described.

Another object of the invention is to compensate the speed control in apparatus of the above character to minimize deviation of turbine speed from the set value.

A further object of the invention is to provide servo-motor mechanism for controlling the flow of fuel and the propeller pitch and controlled by vacuum tubes which are controlled in response to torque, speed and temperature electrical outputs.

A further object of the invention is to provide a main system subject to torque, speed and temperature control and which is manually adjustable to vary the power delivered by the turbine to the propeller together with an emergency system which is normally ineffective but which is automatically rendered effective in response to an emergency operating condition, the emergency system comprising speed control of pitch and fuel-air ratio control of the fuel input.

Another object of the invention is to provide means movable manually to adjust the torque, speed and temperature settings of apparatus of the character aforesaid wherein the manual means is movable through a first range to adjust the speed setting to bring the turbine speed up to a desired value and then is movable through a second range to adjust the torque, speed and temperature settings to increase the power delivered by the turbine to the propeller.

Another object of the invention is to provide manually-movable means for adjusting the torque, speed and temperature settings of the aforesaid apparatus such that movement through a first range is effective to bring the turbine to full speed, movement through a second range is effective to increase the power delivered to the propeller by the turbine with the latter operating at full speed, and movable through a third range, with the turbine operating at full speed, to reverse the propeller pitch and control the pitch over the reverse pitch range provided that the flight velocity does not exceed a predetermined amount.

The foregoing and other objects are effected by our invention as will be apparent from the following description and claims taken in connection with the accompanying drawings, forming a part of this application, in which:

Fig. 2 is a diagram showing the relationship of fuel input to rotative speed;

Fig. 3 is a diagram showing temperature curves as related to thrust or power and engine speed;

Figure 4B:
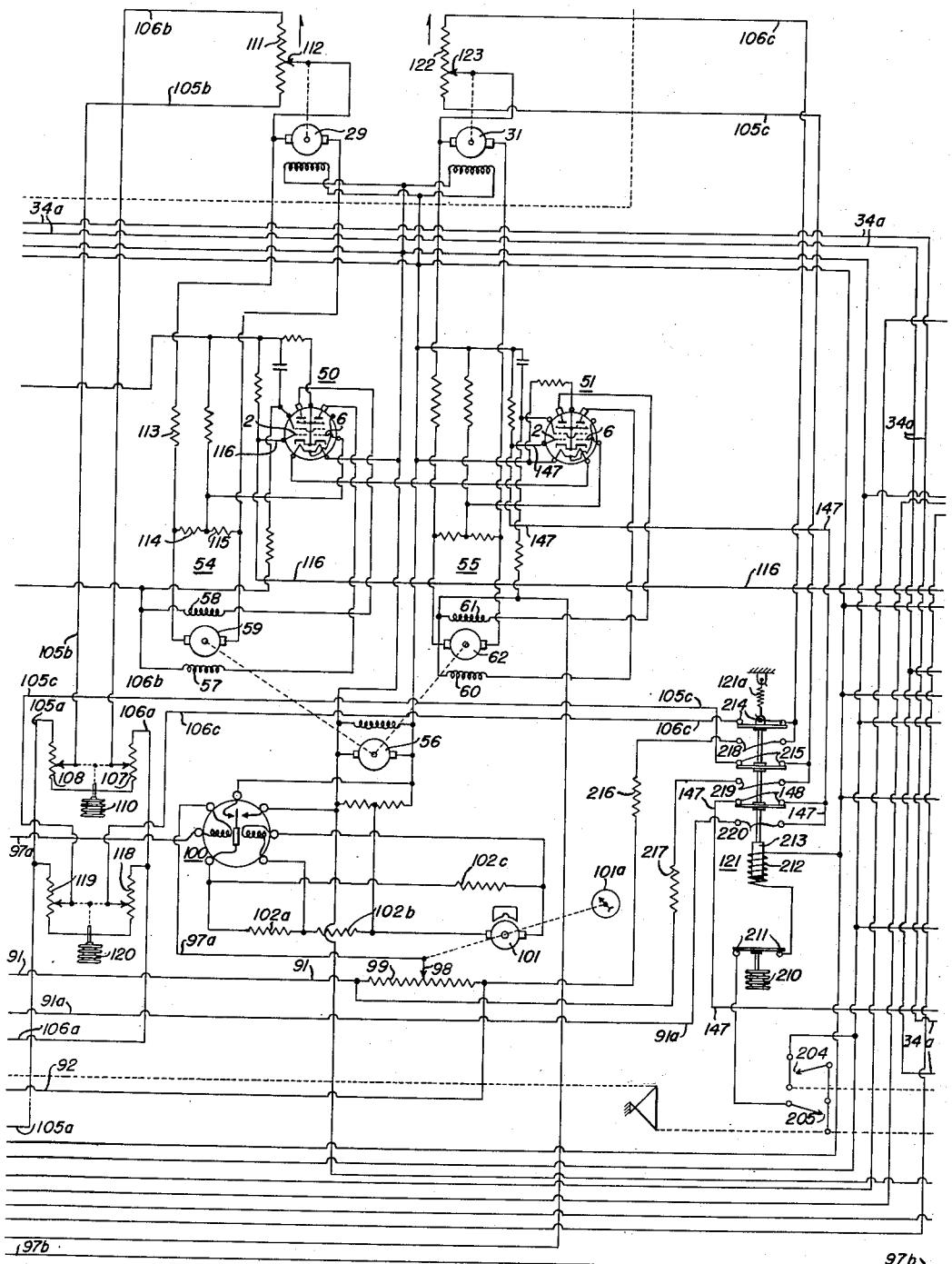
Figure 4C:
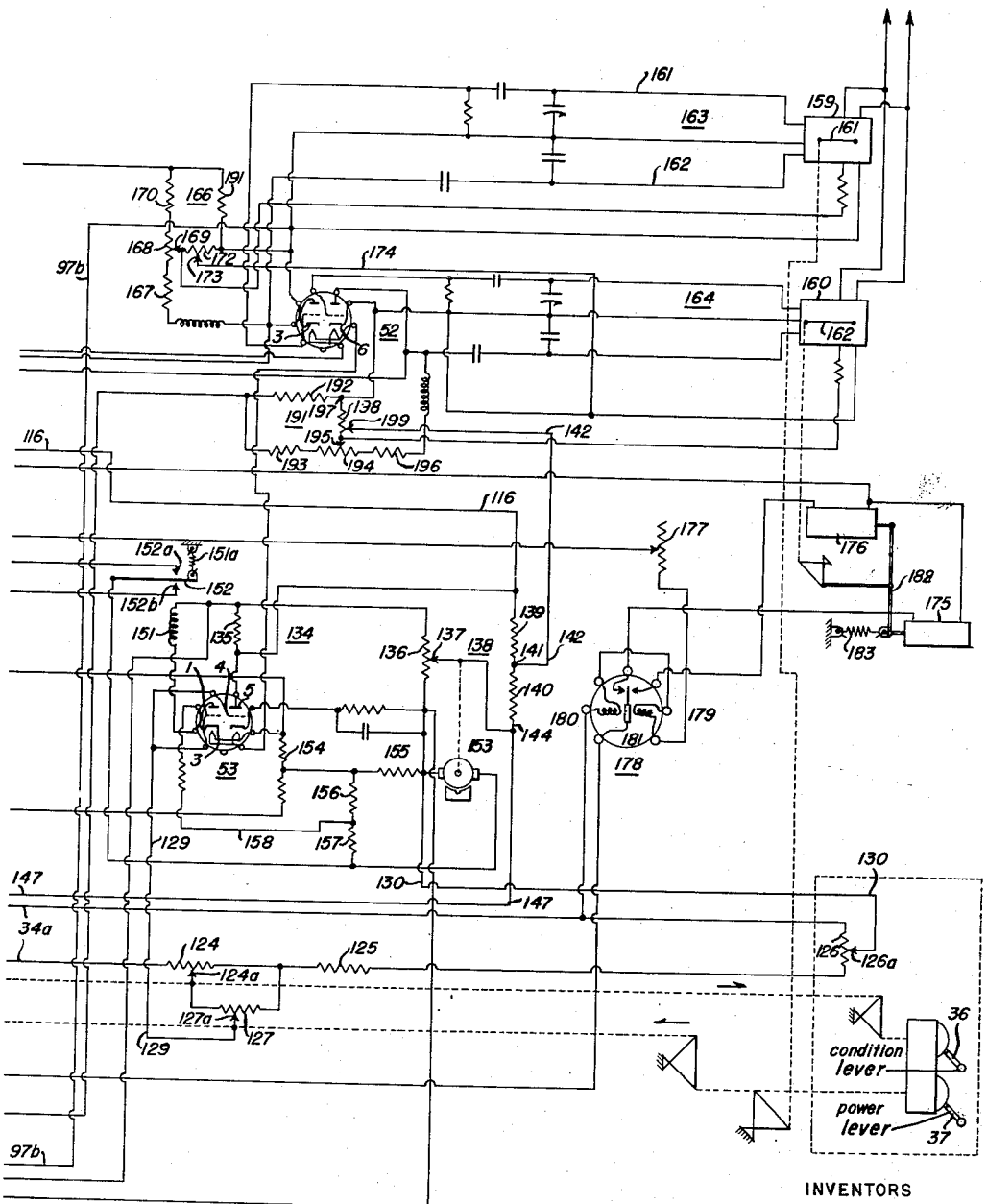
Figure 5:
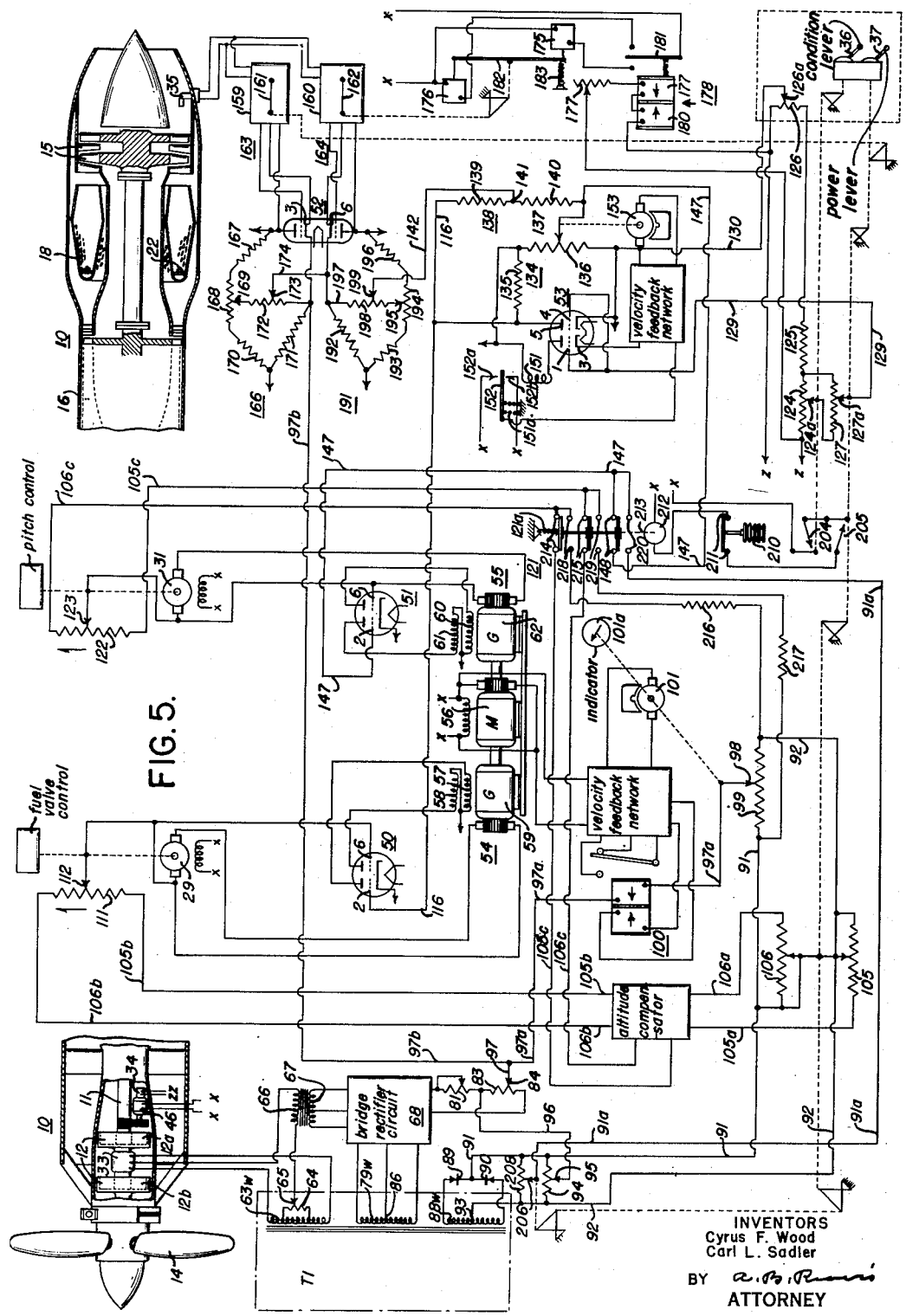
Figure 7:
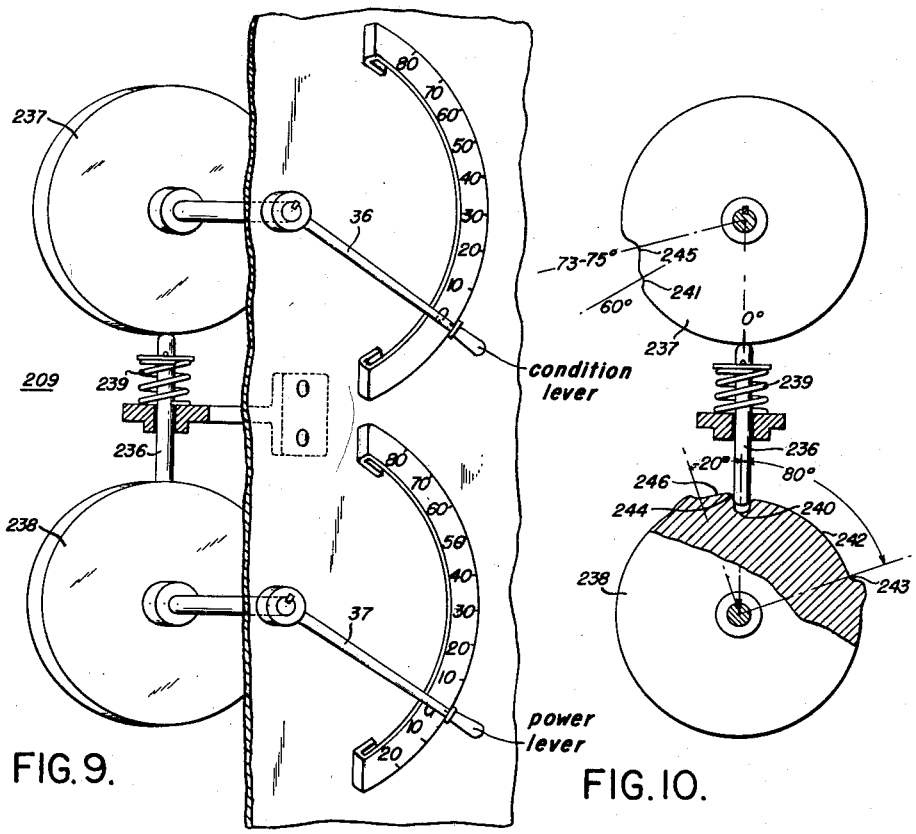
Figure 8:
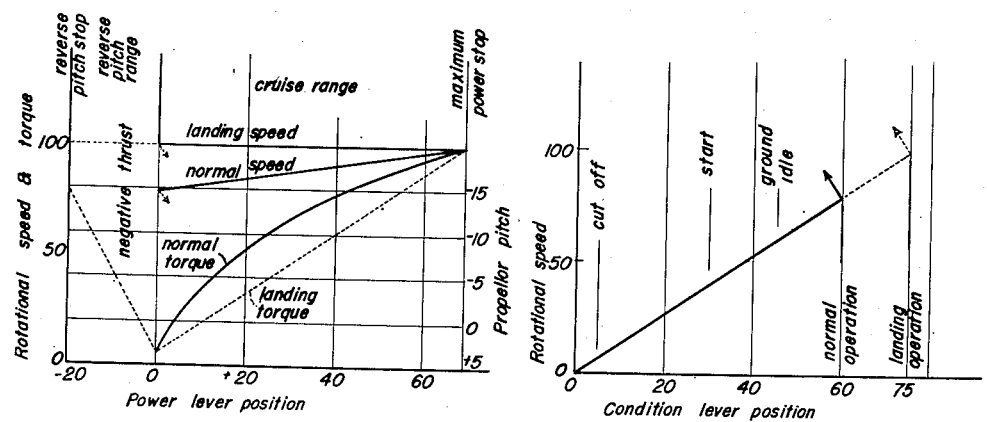

Figs. 4A, 4B and 4C collectively constitute a diagrammatic view showing electrical controlling apparatus;

Fig. 5 is a simplified diagrammatic view showing essential components and relations of Figs. 4A, 4B and 4C;

Fig. 6 is a fragmentary view of an electric torquemeter;

Figs. 7 and 8 are graphs indicating operating conditions in relation to engine speed and condition lever and power lever positions;

Figs. 9 and 10 show the interlock arrangement for the condition and power levers; and Fig. 11 is a detail view showing diagrammatically a variable pitch propeller and its operating means together with electrical means effective to shift control of the propeller pitch from the main to the emergency system.

In the drawings, there is shown a gas turbine plant, at 10, having a power shaft 11 transmitting power, through two-stage reduction gearing 12, to a propeller 14. The gas turbine plant comprises a gas turbine 15 driving a compressor 16 furnishing air to combustor means 18 to support combustion of liquid fuel supplied thereto and to admix with the products of combustion to form gaseous motive fluid for operation of the turbine.

The present invention is concerned with a main control system subject to manual control from the cockpit and which is responsive to torque, temperature and speed to vary the propeller pitch and the input of fuel to the combustor automatically in accordance therewith and it is also concerned with an emergency system for controlling the propeller in response to speed with manual control of the fuel input in the event of a plant operating condition including failure of the main control.

The principal feature of the invention is the main control system including torque, temperature and speed regulators operative to control the propeller pitch and to vary the fuel input in response to torque, speed and temperature for operation of the plant over the power and speed range stably and with good performance and wherein over-temperatures bring about fuel restriction to limit the temperature and thereby avoid stalling of the compressor.

A second feature of the invention is an emergency control system, involving control of the propeller in response to speed and manual control of fuel input, which is automatically rendered effective in response to operating conditions including failure of the main control system.

A third feature of the invention is altitude and flight velocity control of the main control system to vary the propeller pitch and fuel input, an important aspect being limited flight velocity below which shift may be effected of the control of pitch in response to speed, torque and temperature to manual control for reversed pitch operation.

The main control system includes torque and temperature regulators which operate to oppose change in torque and temperature and which have settings operative to increase and decrease the torque and temperature levels. Increase in either torque or temperature brings about a response which results in reduction in fuel input and propeller pitch. The main control system also includes a speed regulator having a setting; however, an increase in speed results in reduction in fuel input and increase in propeller pitch. As control of fuel input and propeller pitch is primarily in response to torque, operating conditions are rapidly sensed and the lag or inertia effects involved with speed and temperature responses are minimized, whereby operation with stability is promoted. While the control system is isochronous and temperature control is linked to speed control, torque control is effective to anticipate temperature and speed changes where the latter are due to changes in fuel flow. Furthermore, torque control stabilizes the system as changes in torque are opposed by changes in temperature. Also, the main control system uniquely and inherently provides for operation at high thermal efficiency without stalling the compressor, as will now be immediately pointed out.

The advantage of control of fuel input and propeller pitch primarily in response to torque will be clearer from a consideration of performance diagrams, Figs. 2 and 3, which show that the engine may be started and brought up to ground idle speed, for example, 8800 R. P. M., Fig. 2, with a small rate of fuel increase; however, from this speed to the top speed of 12,700 R. P. M., the allowable fuel input increases more rapidly than speed.

The fuel input has to be controlled in relation to rotational speed and temperature so as to avoid stalling of the compressor. While thermal efficiency is increased by increase in turbine temperature and the latter is increased with increase in fuel input, increase in fuel input requires increase in turbine speed, otherwise a compressor stall condition may be reached. In Fig. 2, operation should be kept below the stall line designated $a$—$b$. From the latter view, it will be apparent that the allowable fuel input increases quite rapidly in relation to speed as the turbine temperature is increased.

Fig. 3 shows the relation of thrust or power to rotational speed for different temperatures. A given power may be produced over a range of temperatures, the speed being increased as the temperature is reduced for development of the same power.

From Fig. 2, it is seen that the fuel input may be increased rapidly in relation to speed, the temperature increasing, and that the temperature is a function of fuel input; and, from Fig. 3, it will be apparent that the same power may be developed with reduction in speed as the temperature is increased. Therefore, as torque increases as the speed is reduced for the same power, change in fuel input may occur with a change in torque which is large in relation to change in speed.

Further, the power output of the propeller in the form of propeller thrust at any speed may be varied by varying the pitch. Therefore, the propeller power output may be kept in balance with the turbine power input by varying the propeller pitch so that the turbine may operate at a speed and at a fuel input giving the best fuel rate, the optimum being a fuel input giving the highest temperature practicable without stalling for any given speed.

Therefore, as change in fuel input with increase in temperature is felt largely as a change in torque, a measure of torque constitutes a primary factor useful to control propeller pitch and fuel input, supplemented by speed and temperature controlling effects. Further, with a change in operating conditions, a change in torque occurs immediately, that is, it anticipates change in speed, whereas, speed and temperature changes being influenced by inertia effects, necessarily lag. Hence, stability of control is promoted by using torque to stabilize the temperature and speed controls.

Referring generally to the main control system, fuel is supplied to the atomizers 22 of the combustor 18 by means, including a booster pump 23, a filter 24, a feed pump 25, a fuel control, at 26, and a dump valve 27, to a manifold 28 or the like supplying the atomizers. The fuel flow control device, at 26, has a motor 29 operative to vary the fuel input.

Mechanism, at 30, is operated by a controlling motor 31 to vary and reverse the propeller pitch.

Controlling inputs are supplied to the control mechanism, at 32, from the torquemeter 33, interposed in the driving connection between the turbine and the propeller, preferably between first and second stages 12a and 12b of planetary reduction gearing, from a tachometer 34, and from turbine temperature-responsive means 35, and outputs are supplied from the control mechanism to control operation of the fuel control motor 29 and the pitch control motor 31. In addition to the torque, speed and temperature inputs, the control mechanism, at 32, also receives inputs from the condition and power levers 36 and 37 arranged in the cockpit and operative to vary the settings for the controlling inputs.

Figure 1:
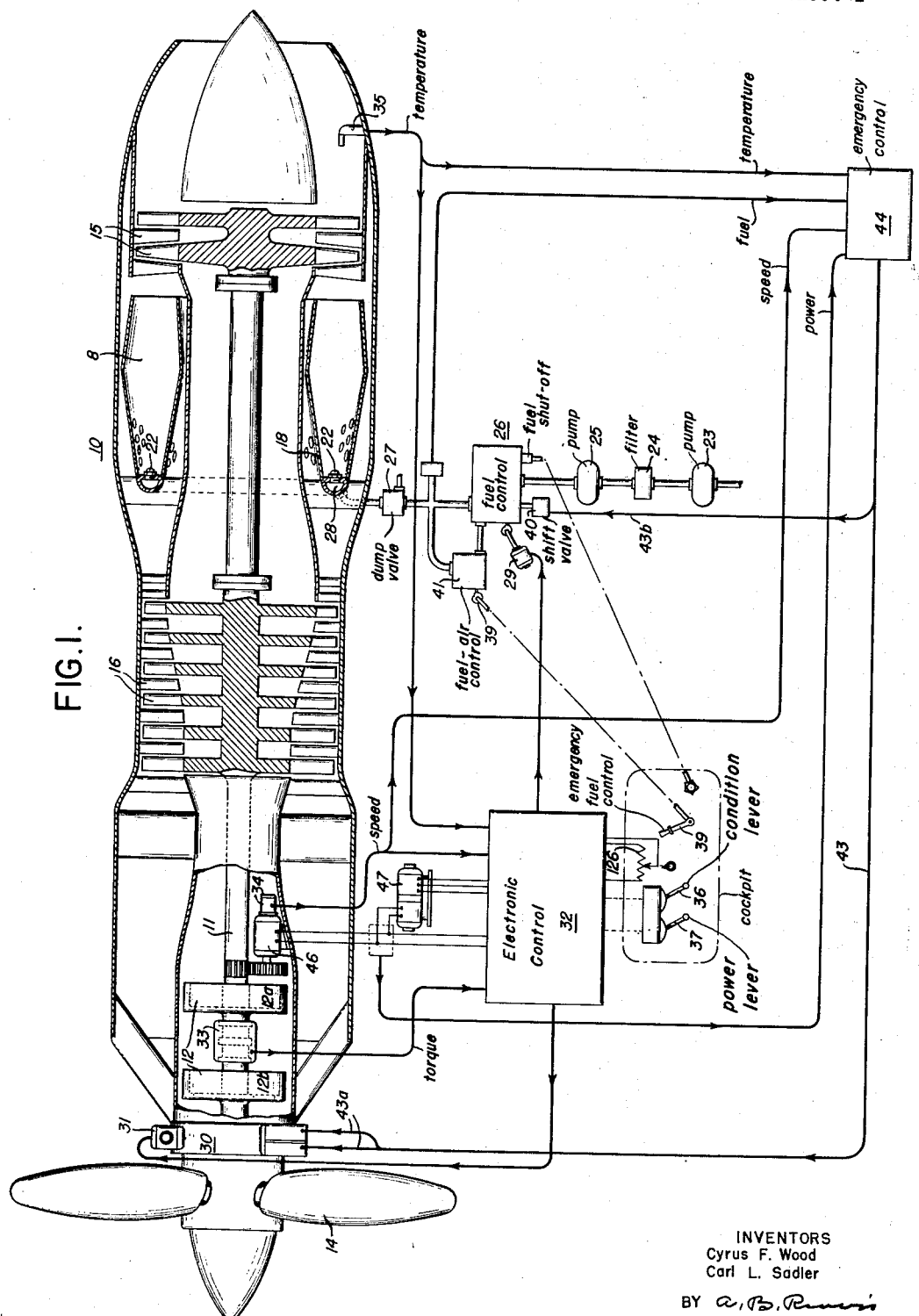
Fig. 1 is an elevational view showing a reversible and variable pitch propeller driven by a gas turbine plant with the improved controlling arrangement applied thereto.

Referring to the emergency controlling system, Figs. 1 and 11, the apparatus, at 30, includes a normally ineffective component which operates automatically in response to speed to vary the pitch of the propeller, the manual control 39 associated with the emergency fuel control apparatus, at 41, then being operated to vary the fuel flow to the combustor atomizers, the apparatus, at 26, having a shift valve 40, which is shifted to cause flow from the feed pump 25 to take place through fuel-air ratio controlling apparatus 41, responsive to flow conditions occurring in the compressor, liquid fuel being discharged from the apparatus 41 through the dump valve to the atomizers.

So long as the main control system is in operation, pressure or potential is maintained in the line 43, pressure or potential in the branch 43a renders the emergency speed and hydraulic pitch control ineffective and renders the main pitch control apparatus effective, and pressure or potential in the branch 43b positions the shift valve 40 so that fuel is supplied through the control apparatus, at 26, so as to flow through the valve controlled by the motor 29, and the dump valve to the atomizers.

To guard against the consequences of certain operating conditions, control is automatically changed over from the main to the emergency system. Among such operating conditions are: failure of main control power; over-speeding; over-temperature lasting a predetermined time; and sudden loss of fuel pressure during take-off. In response to any of these conditions, means, such as diagrammatically and collectively indicated at 44 (Fig. 11), is operated to reduce the potential in the line 43, such reduction resulting in the speed and hydraulic pitch control taking control of the propeller, in interrupting the driving connection between the pitch control motor 31 and the propeller, and in movement of the shift valve 40 so that flow of fuel under control of the manual means 39 takes place through the fuel-air ratio apparatus 41 to the atomizers.

As the means 35 responsive to turbine temperature is preferably constituted by an arrangement of thermocouples and as a torquemeter of the electric type gives very rapid response, I prefer to use an electric tachometer 34 and to provide electrical sources of D. C. and A. C. power provided, respectively, by the D. C. generator 46 and the inverter 47, the latter operating to develop A. C. power at high frequency, for example, 400 cycles per second. With electrical inputs, the control apparatus, at 32, is preferably of the electronic type, whereby small changes in electrical inputs from the torquemeter, the tachometer and the thermocouple arrangement may be used to control direct and alternating current power received from the generator 46 and the inverter 47 so as to control the direction and magnitude of D. C. power supplied to the fuel control motor 29 and the pitch control motor 31. The electrical apparatus, at 32, is shown diagrammatically in a view composed of Figs. 4A, 4B and 4C arranged side-by-side, the same conductor from figure to figure being identified by the same letter.

In general, the voltage responsive or electronic control apparatus, at 32, includes twin, vacuum tubes, at 50, 51, 52 and 53 (Figs. 4 and 5) subject to electrical inputs from the torquemeter, the thermocouple arrangement, and the tachometer to control power supplied to the fuel control motor 29 and to the pitch control motor 31 so that, with either changing turbine torque or temperature, the motors 29 and 31 are operated to change the fuel input and the propeller pitch, an increase in either torque or temperature being accompanied by a decrease in fuel flow and propeller pitch. On the other hand, with change in turbine speed, the motors are operated to change the fuel flow and pitch oppositely, an increase in speed causing reduction in fuel flow and increase in pitch. To reverse the propeller pitch and to control the reversed pitch, torque and speed control of the pitch control motor are replaced by manual control.

The vacuum tubes, at 50 and 51, are effective to control directly the fuel control and pitch control motors 29 and 31, such tubes not only receiving the torque load control voltage but also algebraically added torque output, speed and temperature voltages. The tube, at 52, receives input from the thermocouple arrangement and impresses its output, added to the torque voltage, through the speed control, on the tubes, at 50 and 51, so that either torque or temperature changing in an increasing direction is effective to reduce both fuel input and propeller pitch and the tube, at 53, receives input from the tachometer and impresses its effect on the tubes, at 50 and 51, so that changing turbine speed changes the fuel input and pitch in opposite directions, an increment of increasing speed reducing the fuel flow and increasing the pitch and vice versa.

Since the electronic network involves fuel-control and pitch-control servo-motor control tubes 50 and 51, each having grids 2 and 6 whose potentials are normally balanced with the potential of each grid 2 subject to change because of torque, temperature and speed changes, a brief consideration of the controlling network and its operation will aid in a ready comprehension of the ensuing detail description. The grids 2 of the fuel-control and pitch-control tubes 50 and 51 are connected by conductors 146 and 147 to the outer ends of the series-connected resistances 139 and 140 in the bridge connection of the speed bridge circuit, at 134, containing the vacuum tube 53 as one of its arms. An increase in speed increases the tachometer voltage impressed on the tube 53, thereby changing the impedance of the tube arm of the bridge and unbalancing the latter to lower the potential of grid 2 of the tube 50 relative to that of its grid 6 and to increase the potential of the grid 2 of the tube 51 relative to that of its grid 6, the unbalanced grid potentials causing servo-motor operation to reduce the fuel input and increase the propeller pitch until, due to potential changes of the grids 6 effected by servo-motor operation, potential balance of the grids of each tube is restored. Since the torque and temperature network outputs are applied to the midpoint 141 between the series resistances, changes in torque and temperature produce like, instead of reverse, operations of the servo-motors.

The temperature network includes temperature and over-temperature control bridge circuits, at 166 and at 191, having as arms thereof left-hand and right-hand portions of the tube, at 52. Increase in thermocouple output varies the tuning of oscillator circuits including the left-hand and right-hand groups of tube elements to vary the impedances of the latter in the bridge circuits. Considering the bridge, at 166, increase in temperature reduces the tube element impedance, thereby making the potential at bridge slider 173 lower than that at the cathode 3; and, as such slider potential is applied to the right-hand cathode 6, the impedance of the tube arm of the bridge 191 is thereby reduced, making the potential of its slider 199 lower than that of the cathode 6. As the slider 199 is connected to the series resistance midpoint 141, increase in temperature results in decrease in potential of the grids 2 relative to the grids 6 of the tubes 50 and 51 for servo-motor operation to reduce the fuel input and propeller pitch in response to increase in temperature. In addition to the bridge 191 operating similarly to the bridge 166 and adding its effect to that of the latter, its primary purpose is that of over-temperature control, it overriding when required, all other factors of control to reduce the fuel input and propeller pitch.

An increase in torque reduces the potential at the torque network slider 84. As such slider is connected, by the conductor 97b, to the cathode 3 of the tube 52, torque changes will be reflected through the temperature and speed control networks to the grids 2 of the tubes 50 and 51 to reduce the potential of such grids relative to that of the grids 6 to reduce the fuel input and propeller pitch in response to increase in torque.

As will be hereinafter pointed out, the network has settings which are operative to change the torque, temperature and speed levels. As long as the torque, temperature and speed levels remain unchanged, the network is balanced; however, balance is disturbed by variation in these operating characteristics or by adjustment of torque, temperature and speed settings. Deviations are minimized by the regulating operation of the system and the settings are operated to raise and lower the regulated torque, speed and temperature levels. Network unbalance is followed by changes in fuel input and propeller pitch to bring about such relation of turbine torque, temperature and speed conditions that the balanced relation is restored.

Changing torque, changing temperature and changing speed are factors which act to adjust the fuel input and pitch to restore balance at any power level. Because of the tendency of changing torque, changing temperature and changing speed to adjust the fuel input and pitch to produce torque, temperature and speed conditions for restoring balance, it will be apparent that, at any torque, temperature and speed level, any tendency to departure therefrom is resisted.

Preferably, the fuel control vacuum tube, at 50, and the pitch control vacuum tube, at 51, respectively control Ward-Leonard, or voltage control, fuel control and pitch control drives, at 54, and, at 55, the tube, at 50, controlling the fields 57 and 58 of the generator 59 of the fuel control drive and the tube, at 51, controlling the fields 60 and 61 of the generator 62 of the pitch control drive, the generators being driven by the motor 56.

In the steady state condition, the opposing field windings of each of the generators have currents supplied thereto by the tubes, at 50 and at 51, such that the opposing magneto-motive forces in the generator fields are equal, with the result that the fuel control and pitch control motors 29 and 31 remain stationary; however, with variation in any of the factors of control, the currents supplied from the tubes, at 50 and at 51, to the generator fields cause the motors 29 and 31 to be operated to vary the fuel input and the pitch in the manner already pointed out.

In addition to the already-described electrical equipment, embodied in the control apparatus or electronic control box, receiving inputs from the torquemeter, the tachometer, the thermocouple arrangement and from the D. C. source, such apparatus, includes a power transformer T-1 receiving power from the A. C. source and delivering power through windings and rectifiers to the tubes already described as well as to other components, such as supplies of bridge circuits, of which the right- and left-hand parts of the tubes 52 and 53 form impedance arms, and of the torquemeter, which will be immediately described.

The torquemeter, at 33, is of the electric or magnetic strain gauge type and it preferably involves the structure and operative principle such as disclosed and claimed in the patent of Bernard F. Langer and Frank W. Godsey, Jr., No.

2,459,171, and, as indicated, it has a pair of coils T-3 and T-4 connected in such a manner that they both produce flux in the same direction.

The fixed coils, T-3 and T-4, encompass spaced and interfitting serrated portions of a pair of spaced collars and an intermediate sleeve (Fig. 6), the collars and the sleeve each being fixedly secured to the power shaft, for example, the section 11a thereof between the reduction gear stages, so that torsional deflection of the latter due to torque causes the gap width at one set of serrations to decrease and that at the other to increase.

With torque applied to the power shaft, the gap width at one set of serrations diminishes slightly while that of the other increases slightly; and, as the coils are supplied with A. C. power, for example, 400 cycles per second, the impedance of the coil over the serration set of diminishing gap width increases while that of the other coil decreases. By using a circuit which measures only the inductive reaction it is possible to measure the difference between the air gap widths with a high degree of accuracy. Since the difference between the gap width of the serration sets is proportional to the shaft torque, the output from the measuring circuit is proportional to torque.

For the purposes of the present description, it will be assumed that, when the torque increases, the impedance of T-3 increases and that of T-4 decreases. The A. C. power for the coils is supplied from the power transformer T-1, through winding 63w, to the outer ends of the joined coils T-3 and T-4. The winding 63w has a central portion with a shunt resistance 64 connected thereacross and a slider 65 cooperates therewith to define the reference potential.

With positive torque being transmitted through the torquemeter, the impedance of coil T-3 is greater than that of T-4 and the voltage drop across T-3 is greater than the drop across T-4. During the part of the cycle when the top of 63w is positive relative to the slider 65, the connection between T-3 and T-4 is negative relative to the slider. During the part of the cycle when the top of 63w is negative, the opposite is true. Hence, an alternating voltage whose phase angle and magnitude, relative to the voltage in 63w, depending upon the value of unbalance between T-3 and T-4 is applied across the primary 66 of transformer T-2 having the secondary 67. To simplify further description, it is assumed that the positive part of the cycle occurs when the top of 63w is positive, and the negative part when the top thereof is negative.

The primary purpose of the transformer T-2 is to produce a push-pull output. The secondary purposes thereof are to change the voltage level and to isolate the torquemeter coils from the rest of the circuit.

The signal induced in the secondary of transformer T-2 is rectified and phase-demodulated by means including the torque bridge, at 68, the latter comprising rectifiers 69, 70, 71 and 72, and resistances 73, 74, 75 and 76 and the zero-setting potentiometer 78. The ends of the secondary 67 and of the supply winding 79w are connected by the bridge, at 68, the secondary winding connection including the potentiometer slider.

The torque bridge comprises upper and lower arms connecting the upper and lower ends of the winding 79w and the pairs of arms have their junctions joined to the ends of the secondary 67. One of the upper pair of arms comprises the rectifier 70 and the resistance 76 while the other includes the rectifier 69, the resistance 74 and the portion of zero-setting potentiometer 78 resistance above the slider 77. One lower arm includes the rectifier 72 and resistance 75, and the other rectifier 71, the resistance 73 and the portion of the potentiometer resistance below the slider.

During the positive swing, the top of winding 79w is positive, current flowing therefrom through rectifier 70, resistances 76 and 75 and rectifier 72 only. Rectifiers 69 and 71 are blocked by the reverse voltage. Since the winding 79w is designed so that its voltage is always at least twice the maximum voltage which can be developed across the secondary 67 of transformer T-2, current can never flow through the blocked rectifiers.

Consider that the left ends of both windings 66 and 67 of the transformer T-2 are either positive or negative at the same time, then, during the positive swing, the left end of the secondary is positive. In addition to the current from winding 79w, current flows from the center tap 80 of the secondary 67 down through the setting resistance 81 and the potentiometer resistance 83, with which the slider 84 cooperates, to the center tap 86 of the winding 79w, the upper part of the winding 79w, the rectifier 70, resistance 76, and back to the right end of the secondary 67.

During the negative swing, current flows from the center tap 80 of secondary 67 down through resistances 81 and 83, the lower half of winding 79w, the rectifier 71, resistance 73, the lower part of resistance 78, and back to the left end of the secondary 67.

Thus, when positive torque is being transmitted by the torquemeter 33, the top of resistance 83 is the positive end during both halves of the A. C. cycle.

The torque reference voltage winding 88w has its ends connected, through the rectifiers 89 and 90, to the positive supply side 91 of the reference circuit whose negative return side 92 is connected to the midpoint 93 of the winding. A potentiometer 94 has the ends of its resistance connected to opposite sides of the reference circuit and the slider 95 of the potentiometer includes the portion of the resistance of the latter in the torque output circuit comprising the conductor 96, the portion of resistance of potentiometer 83 above the slider 84, the conductor 97 connected to the slider and branches of such conductor to be described; and the return side 92.

The potentiometer 94 provides the torque reference voltage for the control system, its slider making it possible to easily adjust for zero torque voltage. The voltage of the torque measuring circuit across the portion of the resistance of potentiometer 83 above the slider 84 bucks the voltage of the potentiometer 94 in the output circuit and to the left of slider 95 when the plant has positive torque output and adds when the plant is absorbing torque. Hence, with increasing torque, as current flows from the left-hand end of 94 to the slider 84, the potential at the latter decreases. On the other hand, with decreasing torque, the contrary is true, the slider potential increasing.

From the foregoing, it will be apparent that there is provided a torque voltage which varies up or down from the reference voltage in linear proportion to the variation in turbine torque.

Further, it will be seen that the magnitude of the output voltage varies in direct proportion to the voltage supplied to transformer T–1. The proportional change in output voltage with changes in torque level is constant. In order to obtain a torque indication, it is necessary to match the output voltage with voltage of potentiometer 99 whose left end is connected to the supply side 91 of the reference circuit, which is supplied from the transformer T–1 by means of the secondary winding 88w.

The torque output circuit from the slider 84 of the potentiometer 83 to the left end of potentiometer resistance 94 includes the conductors 97 and 97a, the slider 98, the portion of resistance 99 to the right of the latter and the return 92. Such circuit includes the winding of the relay, at 100, controlling a motor 101 for moving the slider 98. The resistances 102a, 102b and 102c form a velocity feedback network for stabilization of the circuit. For zero torque, the slider 98 is positioned by the motor depending upon the setting of the slider 95 of potentiometer 94.

As the output torque of the turbine increases, the slider 98 of the potentiometer 99 moves to the right, thereby operating the visual indicator 101a, thus decreasing the voltage output of the potentiometer to balance the decrease in output from the torque output circuit.

Neglecting for the moment the effect of speed and temperature signals on the operation of the control, the operation of apparatus so far described for varying the fuel input will now be considered. The output of the torque circuit is from the slider 84 of the potentiometer 83 to the left-hand end of the potentiometer 94. The torque control circuit for the fuel input motor 29 may be considered as beginning with the setting rheostats 106 and 105, which function to put position of the power lever 37 into such circuit. The output from these two rheostats is supplied by the leads 105a and 106a to rheostats 107 and 108 which form the altitude bias on sensitivity of the controlling circuit, a bellows 110, or the like, being effective to move the sliders along the resistances of the rheostats 107 and 108.

The voltage developed between the sliders of the rheostats 107 and 108 is applied directly by the leads 105b and 106b to the position feedback potentiometer 111 for the fuel input valve actuator operated by the motor 29. The slider 112 of the potentiometer 111 is connected, through the velocity feedback resistance networks 113, 114 and 115 to one of the control grids, the grid "6," at the right side of the tube, at 50. The other control grid "2," at the left side of such tube, is connected, through the lead 116, the speed control and the temperature control to the torque output slider 84, as hereinafter described. Thus, the torquemeter is a torque regulator in which the voltage shift set in by operation of the power lever determines the torque level at which regulation occurs, the torquemeter output voltage serving to control the fuel and pitch to minimize torque deviation at the adjusted point.

Assuming that the sliders of the rheostats 105, 106, 107 and 108 are fixed, then the operation of the circuit is as follows: The voltage drop across the potentiometer 111 and the voltage level at the bottom of the latter will be in fixed relation to the voltage applied by the potentiometer 94. Assuming that the circuit is in balance at some torque level, if a step of increase in torque occurs, this will decrease the voltage at the slider 84 of potentiometer 83 relative to the voltage at the left end of the resistance of potentiometer 94; and with the grid potential fixed by adjustment of the torque setting potentiometers 105 and 106, the increase in torque acts, through the temperature and speed control, to reduce the voltage of grid "2" relatively to that of grid "6," in consequence of which the right section of the tube, at 50, will conduct more current than the left section thereof, and more current will flow through the lower field winding 57 of the generator 59 of the fuel control Ward-Leonard drive, at 54, than through the upper winding 58 thereof.

Since the circuit was in balance at the beginning, the same amount of current was flowing through both generator windings; and, in this condition, no voltage was generated in the armature of the generator. However, as the torque changes, the resulting unbalance in current between the two field windings, causes voltage to be generated in the armature of generator 59, and thus causes rotation of the fuel control motor 29, the latter motor rotating to move the slider 112 downwardly, and decrease the fuel input, the slider 112 being brought to rest with the voltages applied to the grids "6" and "2" of the tube at 50 balanced and the circuit is restored to balanced condition. Thus, the input of fuel is changed to correct for the torque change. The opposite action will occur if the torque falls below the set point.

If the pilot wishes to increase the output of the engine, he operates the power lever 37 to move the sliders of the torque setting rheostats 105 and 106 to the left, thereby decreasing the voltage level at the bottom of potentiometer 111. To rebalance the network, pursuant to said power lever movement of the sliders of 105 and 106, the fuel input control motor 29 is driven in a direction which moves the slider 112 of potentiometer 111 upward. Since this motion increases the fuel flow, it also increases the power output of the turbine. It should be noted that, because the increase in torque tends to cause a decrease in fuel flow, the motion of the actuator does not proceed as far as it would if there were no change in turbine torque.

Control of the tube, at 51, of the drive, at 55, for the pitch control motor is similar to that of the tube, at 50, of the drive, at 54, for the fuel valve control motor. As with the fuel control motor, the controlled circuit may be considered as beginning with the torque setting rheostats 105 and 106. The output of these rheostats is applied to the sensitivity biasing rheostats 118 and 119, the bias thereof being under the control of the flight velocity and atmospheric density bellows 120. The voltage developed between the sliders of the biasing rheostats is applied, by the leads 105c and 106c and through the reverse pitch relay, at 121, to the position feedback potentiometer 122 of the pitch control motor 31. Under normal flight conditions, the operation of the remainder of the circuit is the same as that for the fuel valve control motor.

To recapitulate with respect to the torque regulating network, the torque setting or level is varied by changing the setting of the potential-range-shifting potentiometers 105 and 106, whereby the potentials at the sliders 112 and 123 and consequently at the grids of the tubes, at 50 and 51, are influenced for motor operation to change the input of fuel and propeller pitch; however, the change in fuel input brings about a change in torque in consequence of which the change in potential at the torque output slider 84 and, therefore, at the grids of the tubes, at 50 and 51, tend to produce motor motion opposing such motion in consequence of the change in setting.

The torque output voltage at the slider 84 performs a regulator function to minimize deviation in torque at any setting. As long as the torque does not change relative to the torque setting, the sliders 112 and 123 of the potentiometers 111 and 122 are positioned depending on the position of slider 95 of the potentiometer 94. Assuming an increase in torque, the potential at slider 84 decreases, whereupon two operations take place. The motor 101 moves the slider 88 to decrease the voltage output of the potentiometer 99 to balance the decrease at the slider 84. The potential at the grids "2" decreases in relation to that at the grids "6," in consequence of which the fuel control and pitch motors are operated to reduce the fuel flow and propeller pitch and to move the sliders 112 and 123 of the potentiometers 111 and 122. The motion of the sliders so produced tends to rebalance the circuit and the change in fuel flow and propeller pitch occurring because of motion of the motors tends to correct the torque change, reduction in torque resulting in increase in potential at the slider 84.

Control of turbine rotational speed and of temperature is accomplished by adding to and subtracting from the ouput voltage from the torque measuring circuit. The control of temperature, as well as that of torque, is accomplished by moving the fuel input control motor 29 and the pitch control motor 31 so that, if either the temperature or the torque increases, the control motors are operated to decrease the fuel input and the propeller pitch. In the case of engine speed, however, the control motors must move in opposite directions, that is, if the turbine rotational speed increases, the fuel input control motor moves in a direction to decrease the fuel flow while the pitch control motor moves in the direction to increase the propeller pitch.

Considering first the operation of the engine rotational speed control, the output of the tachometer generator 34 is applied, by the circuit 34a, across the resistances 124, 125 and 126, 124 being the setting potentiometer which puts the position of condition lever 36 into the circuit, 125 the maximum R. P. M. setting resistor, and 126 the pilot's R. P. M. trimmer, the latter being in the cockpit and used to synchronize power units in a multiple-unit installation. The setting potentiometer 127 puts the position of power lever 37 into the circuit. The voltage developed between the sliders 126a and 127a of the potentiometers 126 and 127 is the control voltage which is fed into the electronic circuit by the leads 129 and 130.

The actual R. P. M. control circuit consists of two sections, one producing a voltage which is proportional to the R. P. M. error and the other a voltage which is proportional to the integral of R. P. M. error.

Considering first, operation of the R. P. M. control circuit without the integrating section being effective, the tachometer 34 provides, by the conductors 129 and 130 for the bridge, at 134, an input voltage, dependent upon rotational speed and the setting of the potentiometers and which is supplied to the grid "4" of the right-hand section of the twin vacuum tube, at 53, that section forming one of the arms of the bridge, at 134, the other three arms being comprised by the resistance 135, the portion of the resistance 136 above the slider 137, and the portion of the resistance 136 below the slider. The cross or output connection of the bridge includes the voltage divider, at 138, comprising upper and lower resistances 139 and 140 joined and having an intermediate point 141 connected by the conductor 142 to the temperature control, as hereinafter pointed out. The upper end of the resistance 139 is connected to the conductor 118 leading to the left-hand grid "2" of the fuel control vacuum tube, at 50, and the bottom end of the lower resistance 140 is connected to a conductor 147 including normally closed contacts 148 of the relay, at 121, and leading to the grid "2" of the pitch control vacuum tube, at 51.

With increasing speed, the potential of the grid "4" of the right set of tube elements of the vacuum tube, at 53, is raised and the resulting potential of the bridge cross connection causes the bottom end of the voltage divider, at 138, to be positive relative to the upper end thereof, in consequence of which the voltages of the grids "2" of the vacuum tubes, at 50 and 51, are changed to reduce the fuel input and to increase the propeller pitch to oppose speed change.

In addition to the velocity or speed response operating on the fuel input and propeller pitch to oppose error or deviation in speed from the setting, there is provided means securing a correcting effect dependent upon the error or deviation magnitude, that is, an arrangement which performs an integrating function.

Therefore, as both the left grid "1" and the right grid "4" are connected to the supply line 129, when the rotational speed suffices to provide a plate current in the left set of tube elements of the tube, at 53, to energize the winding 151 adequately to pull down the armature 152, the power circuit for the motor 153 is closed through the voltage divider 154 and the motor operates to move the bridge arm slider 137 upwardly to transfer resistance from the upper arm to the lower one of adjoining arms of the bridge.

As the motor 153 has a velocity feedback network comprised by resistances 155, 156 and 157, of which the resistance 155 is in series with the motor armature and the resistances 156 and 157 are in shunt therewith and form a voltage divider whose intermediate point is connected, by a conductor 158 and cathode resistor, to the cathode "3" of the left section of the vacuum tube 53, there is introduced into the cathode circuit a voltage which is proportional to the rotational speed of the motor and the voltage is always in a direction tending to stop the motor.

Therefore, when the rotational speed increases above a set point, the motor 153 operates to move the slider 137 upwardly to transfer resistance from the upper bridge arm to the lower bridge arm at a rate which is proportional to the error between the actual and set engine speed. This motion tends to raise the voltage of the slider relative to the voltage of the plate "5" of the right section of the tube 53. Thus, the left, or integrating section of the tube produces a correction voltage in the same direction as the right section thereof.

The motor 153 is reversed dependent upon engagement of the armature contact 152 with either the fixed upper contact 152a or the lower one 152b. The operative engagement with the lower contact has just been described. When the upper contact is engaged, the motor is driven in a direction to lower the slider 137. As the armature contact 152 is moved by the opposing forces of the spring 151a and the magnet winding 151, the moved contact will operate in a hovering manner to control the motor to shift the bridge slider slightly up and down, whereby the bridge arms are adjusted to vary the output voltage applied across the resistance of the voltage divider, at 138.

As the motor armature is connected in the cathode circuit of the left section of the tube, at 53, a voltage proportional to motor speed will be applied to the cathode circuit, which is so arranged that this voltage is always in the direction tending to stop the motor. Thus, the motor will run at a speed which is proportional to the deviation of the control signal from a set value, and it is this proportional speed response of the motor 153 that makes the circuit produce the integral of rotational speed error. Hence, as the motor 153 moves in a direction determined by and at a speed dependent on the deviation and as the bridge is adjusted thereby to provide a correction voltage acting in the same direction as the first correction voltage, such an arrangement operates as a compensator to minimize deviation of turbine speed from the set value.

Temperature control utilizes voltages supplied by the thermocouple arrangement 35 so that an increase in temperature tends to decrease both the fuel input and the propeller pitch. To this end, by way of example, there are provided controls, at 159 and, at 160, responsive to temperature and to adjustment of their levers 161 and 162, respectively, to vary the tuning of the high frequency oscillator circuits, at 163 and at 164, and including the right and left sections of the twin vacuum tube 52.

The first control, at 159, is effective, with torque and speed, continuously to control fuel input and propeller pitch, whereas, the second control, at 160, in addition to aiding the first, protects against over-temperatures, the latter control being operative, dependent upon the speed setting and the attainment of sufficient temperature, to override the other controls and restrict the fuel input and propeller pitch. The first control lever 161 is moved by the power lever 37 and the control lever 162 is moved in response to tachometer output, as hereinafter described.

Control of the set point of the control, at 160, as a function of engine R. P. M. is necessary because of the stall characteristics of the compressor. Compressor stall makes it necessary to limit the turbine inlet temperature to a value slightly higher than 1360° R. when the engine R. P. M. is less than 8800. When the R. P. M. is reached, the turbine inlet temperature may be raised to 1660° R.; and when the speed reaches 9800 R. P. M., the temperature may be raised to 1960° R., these being approximately the engine speeds at which the set points of the control, at 160, will be changed.

Referring to the first temperature control, at 159, and the oscillator circuit, at 163, which includes the left part of the vacuum tube, at 52, such left part of the tube also constitutes an arm of a bridge, at 166, and whose other arms are comprised by the resistance 167 and the adjacent portion of the resistance 168 to one side of the slider 169, the portion of the resistance 168 at the other side of the slider and the adjacent resistance 170, and the resistance 171. The bridge has an output or cross connection joining the slider 169 and the cathode "3" of tube, at 52, the connection including the resistance 172 with which cooperates the slider 173 to constitute a sensitivity potentiometer.

The slider 173 is connected, by the conductor 174, to the over-temperature control, that is, to the cathode "6" of the right section of the tube, at 52.

Increase in temperature changes the tuning of the oscillator circuit, at 163, to increase resistance of the bridge arm formed by the left part of the tube, at 52, in consequence of which the cathode "3" is made positive with respect to the slider 173; and, as the cathode is connected, by the conductor 97b, to the slider 84 of the torque potentiometer, at 83, increase in temperature is effective in the same manner as torque, that is, such increase brings about reduction in fuel input and propeller pitch.

With respect to over-temperature control, its oscillator circuit, at 164, operates in a similar manner except that its control, at 160, instead of having the effect of power lever position set therein by operation of the lever 161, as with the control, at 159, it has its adjusting lever 162 mechanically connected to magnetic operating devices, at 175, and, at 176, which operate upon the attainment of predetermined speeds, as determined by the setting of the resistance 177 in the input supply from the tachometer to the relay, at 178, and upon the spacing of a pair of fixed and spaced contacts of the latter. Therefore, in addition to temperature, the circuit, at 164, depends on speed so that, as speed is increased, the temperature point or temperature points at which the over-temperature control becomes effective are raised.

The relay, at 178, includes windings 179 and 180 and a biased armature 181. As long as the speed is below a given value, dependent upon the resistance and relay settings, for example, 8800 R. P. M., the armature is biased to complete a circuit including the magnet winding of the device 175, whereby the lower end of the lever 182 is pulled to the right against the force of a spring 183 in which position, the control is set to restrict fuel input to limit the temperature to a desired value, for example, slightly higher than 1360° R. as long as the speed is below 8800 R. P. M.

With increase in speed and increased energization of the relay windings, the armature is pulled away from the left contact of the relay, breaking the circuit for the device 175, whereupon the spring 183 is effective to pull the lower end of the lever to the left. As the lower end of the lever 182 is moved from the extreme right position to the extreme left position, such motion is transmitted by suitable linkage to the setting lever 162 of the control, at 160.

The effect of adjustment in response to speed is to raise the temperature point at which the control, at 160, is effective to bring about overriding of the other controls and restrict the input of fuel and the propeller pitch, that is, the temperature is limited to a higher value, for example, 1660° R, when the rotational speed of 8800 R. P. M. is reached.

With further increase in speed, the biased armature 181 is pulled to the right engaging its contact with the right one of the spaced contacts of the relay to complete the circuit through the magnet winding of the device 176, energization pulling the upper end of the lever 182 to the extreme left to operate the linkage to move the lever 162 of the control, at 160, to a higher temperature point so that, when a speed of 9800 is reached, the temperature may be raised to 1960° R.

The right part of the twin vacuum tube, at 52, forms a component of the over-temperature oscillator network, at 164, and it constitutes one arm of a bridge, at 191, whose other arms are provided by the resistance 192, the resistance 193 and the portion of the resistance 194 to the left of the slider 195, the portion of the resistance 194 to the right of the slider and the resistance 196. The cross connection 197 of the bridge joins the slider 195 and the cathode "6" of the right section of the vacuum tube, at 52, and it includes a resistance 198 with which cooperates a slider 199 to form a potentiometer.

As the conductor 142 connects the slider 199 with the intermediate point 141 of the speed voltage divider, at 138, as a conductor 174 connects the slider 173 of the potentiometer of the bridge, at 166, to the cathode "6" of the right part of the tube, at 52, and, as the cathode "3" of the tube is connected to the torque potentiometer slider 84, provision is thereby made for algebraic addition of torque output, temperature and speed voltages for the exertion of controlling effects on the tubes, at 50 and 51. In other words, torque control acts through temperature and speed control to influence the potential at the grids of such tubes, resulting in operation of the fuel and pitch control motors until grid potential balance of the tubes is restored.

The over-temperature control comes into play and overrides all other factors of control to limit fuel input and pitch to avoid predetermined temperatures being exceeded until predetermined speeds are reached, the over-temperature response changing the voltage relation of the bridge slider 199 and the cathode "6" and applying voltage through the conductor 142 to the intermediate point 141 of the voltage divider and thence to the grids of the tubes, at 50 and 51, to bring about restriction of fuel and pitch. Thus, in addition to the controlling system being effective to provide for an operating temperature which increases as the speed increases, provision is made for temperature and speed limiting the fuel input and pitch so as to avoid stalling of the compresesor.

In the electronic control box, indicated at 32, the condition lever 36 is connected to the slider 124a of speed setting potentiometer 124 and the movable contact of switch 204. Similarly, the power lever 37 is connected to the slider 127a of speed setting potentiometer 127, the setting lever 161 of the temperature control, at 159, the movable contact of switch 205, the sliders of rheostats 105 and 106, and the setting slider 206 of resistance 208 whose ends are joined to opposite sides 91 and 92 of the voltage reference circuit.

In the circuit diagram of Fig. 4C, the rectangle marked off by dash lines indicates the cockpit in which the condition and power levers and the tachometer circuit resistance 126 are located. In this view, movement to the right of the linkage marked "Condition lever" or movement of the linkage marked "Power lever" to the left is equivalent to moving either of these levers to a higher angular position on its quadrant. The proper operation of these levers for plant operating and flight conditions is graphically indicated by Figs. 7 and 8.

Assume that the power lever is in its zero position with the slider 127a at the left end of resistance 127, the full effect of the voltage change due to the motion of the condition lever slider 124a along the resistance 124 is felt in the R. P. M. control circuit. Thus, the condition lever produces its full effect on the R. P. M. setting.

If the power lever slider 127a were at the right end of resistance 127, moving the condition lever would have no effect on the R. P. M. setting. This is exactly the case when the power lever is set for maximum plant output.

Similarly, motion of the power lever has less and less effect on the R. P. M. setting as the condition lever slider 124a is moved further and further to the right along the resistance 124 incident to movement of the condition lever 36 to a higher and higher position on its quadrant.

Actually, because of mechanism, at 209 (Figs. 9 and 10), mechanically interlocking the levers, the power lever slider 127a cannot be moved unless the condition lever slider 124a is near the right end of the resistance 124.

As the right end of the power lever linkage is moved to the left, the power lever slider 127a is moved to the right, the lever 161 of the temperature control, at 159, is moved upward, the movable contact of switch 205 is moved to the right, the sliders of rheostats 105 and 106 are moved to the left, and the slider 206 is moved to the right along resistance 208. Thus, when the pilot calls for more turbine power, he increases the torque, speed and temperature settings.

As the right end of the condition lever linkage is moved to the left, the slider 124a is moved to the right. Hence, when the pilot moves the condition lever to a higher position on the quadrant, he increases the turbine speed setting.

In order to go into reverse pitch operation, the condition lever must be in its maximum speed position before the power lever can be moved into the reverse pitch position. When the condition lever 36 is in its maximum position, the switch 204 is closed; and, with initial movement of the power lever 37 from the zero position into the reverse pitch range, the switch 205 is closed. When the flight velocity of the airplane is below some set value in the neighborhood of 130 knots, the flight velocity bellows 210 allows the switch 211 to close; and, if the condition and power lever switches are already closed, closing of the flight velocity switch 211, completes the circuit to energize the coil 212 to pull the core or armature 213 down to move the relay, at 121, to reverse position.

Upon movement of the relay, at 121, to reverse position, incident to closing of the switches 204 and 205 by upward or forward movement of the condition lever and downward or reverse movement of the power lever and to closing of the switch 211 just as soon as the flight velocity is at or below a predetermined amount, the pitch control potentiometer 122 is disconnected from the normal circuit by opening of relay contacts 214 and 215 and it is directly connected, through resistances 216 and 217, to the reference supply by closing of contacts 218 and 219, said normal circuit including the contacts 214 and 215 and being supplied through the power lever potential range-shifting potentiometer rheostats 105 and 106, from the torque reference voltage supply and return lines 91 and 92. This makes the voltage drop across and the voltage level at the bottom of the resistance of the potentiometer 122 directly proportional to the reference voltage and independent of the power lever positions. The grid "2" of pitch control tube, at 51, is disconnected from the speed control voltages by opening of contacts 148 and it is directly connected, by closing of contacts 220 and the conductor 91a to the slider 206 of resistance 208. Thus, the position of the propeller pitch control actuator is controlled directly by the position of the slider 206.

As the end of the power lever linkage is moved to the right, to a position of greater reverse pitch, the slider on 206 is moved to the left, decreasing the voltage between the slider and the left end of the resistance 208. In order to keep the circuit in balance, the pitch control actuator must move the slider 123 of pitch control position potentiometer 122. The propeller blades move in the direction of more reverse pitch in response to this action of the pitch control actuator.

When the pilot wishes to go back to normal operation, he merely has to move the power lever back into the normal operating range. This opens switch 205, deenergizing the reverse pitch relay, at 121, whereupon the biasing means or spring 121a is effective to move the relay to reestablish the normal circuit connections.

During reverse pitch operation, the fuel valve actuator must accomplish the entire control of the engine R. P. M. Since both the temperature control of the torque control are set at their minimum positions, the speed control circuit must be capable of overriding the signals from both of these when the propeller is set for high values of reverse pitch.

Referring to the interlocking mechanism, at 209, for the condition and power levers 36 and 37, with both levers at 0°, the power lever is locked so that only the condition lever can be moved and the power lever remains locked until the condition lever is moved slightly beyond 60°. This provides for starting and bringing the turbine up to idle ground speed, say 8800 R. P. M. when the condition lever has been moved 60°, and up to about 12,700 R. P. M. when it has been moved to from about 73° to 75°. With the condition lever at the 73° to 75° position, the power lever may be moved through its full forward and reverse range; and, just as soon as the power lever is moved about 1° from 0° in the forward range, the condition lever is locked so that it cannot be moved below 60°. When the power lever is moved about —1° in the reverse range of —20°, the condition lever is locked in the 73° to 75° position.

Assuming that the main control system is in operation, provision is made for changing over to the emergency system in the event of certain operating conditions. The change-over should be effected when the main control fails, as by failure the primary power supply; if a 5 per cent over-speed condition is attained, control should be transferred to the emergency system; persistence of 10 per cent over-temperature for more than 5 seconds should be effective to transfer control to the emergency system; and a 20 per cent loss of fuel pressure during take-off should bring about the same effect.

Accordingly, in Fig. 11, showing diagrammatically a propeller blade whose pitch is varied either by the automatic main control or by an engine governor, the pressure line 43 is shown in the form of electric circuit 43x, which, with the main control system in operation, is effective to hold the magnetically-operated valve 40 in the position connecting the fuel control, at 26, for flow of fuel through the valve controlled by the motor 29 to the atomizers. The energized circuit 43x also supplies the circuit 43a to maintain the by-pass valve 223 of the speed governor hydraulic pitch control system open to break the connections of the hydraulic transmission to the propeller blades so long as the circuit 43x is energized. Also, as long as the circuit 43x is energized, it is effective to render the pitch control motor 31 operative to vary the pitch of the propeller blades. Furthermore, the automatic control system motor is operative by means, including the clutch 225, for turning the propeller blades. Upon deenergization of the winding 43b, the spring 43c moves the valve 223 to connect the governor, at 38, with the hydraulic cylinder 30a for movement of the operating piston 30b against the spring 30c to turn each propeller blade 14 about its longitudinal axis to vary the pitch. Upon opening the circuit, the valve 40 is shifted for manual control of fuel input, the governor connection for controlling the propeller pitch is established, and the motor 31 is disconnected from the propeller blades.

From the apparatus described, it will be apparent, that maintenance of the fuel control and the pitch control for operation by the main control system is dependent upon the circuit 43x being energized. Therefore, to protect the plant in the event of the operating conditions above referred to and effect transfer of control from the main system to the emergency system, there are shown, diagrammatic features of control operating to secure this result. Upon failure of the primary power supply for the main control system, control of propeller pitch is transferred from the main control system by interruption of the connection between the motor 31 and the propeller blades and by rendering the hydraulic system 30 effective by closing the by-pass valve and by movement of the valve 40 to shift the flow of fuel through the fuel control valve operated by the motor 29 for flow through a passage controlled by the manual control 39, the fuel passing through the ratio control device 41 and then to the atomizers.

In the event of a 5 per cent over-speed condition, a conventional auto-stop or emergency governor, at 230, is operative to interrupt the circuit 43x. Such a governor is a common expedient in the turbine art. As shown, it includes a pin 230a movable outwardly due to centrifugal force to move the lever 230b to trip the latch 230c normally holding the switch 230d closed against the force of a spring 230e.

If there is an over-temperature of 10 per cent persisting more than 5 seconds then the over-temperature is effective to control a switch 231 to operate a timing switch 232 in the circuit 43x, the arrangement being such that, with an over-temperature of magnitude indicated and persistence of such over-temperature for a short time, for example, 5 seconds, the switch 232 will be operated to interrupt the circuit 43x, whereupon, as already indicated, control of fuel input and of the propeller is transferred from the main to the emergency system.

Likewise, when a loss of fuel pressure occurs to the extent of about 20 per cent during take-off, the same result is effected. To this end, there is provided a switch 234 operative in response to altitude and to pressure of fuel supplied to the atomizers, the arrangement being such that, with low altitude or low flight velocity, indicative of conditions at take-off, a loss of fuel pressure to the extent indicated will be effective to move the switch 234 to interrupt the circuit 43a.

While any suitable interlock may be used in connection with the condition and power levers 36 and 37, as shown in Figs. 9 and 10, the interlock, at 209, comprises a detent 236 cooperating with the condition lever and power lever disks or cams 237 and 238. The detent is biased by a spring 239 toward the disk 237. The disk 238 has a recess 240 to receive one end of the detent with the latter retained against the force of the spring by the disk 237. Upon movement of the disk 237 to the 60° position, the recess 241 comes opposite to the adjacent end of the detent to provide for withdrawal of the latter from the recess 240 sufficient to permit the arcuate surface 242 to move under the detent end, the terminal abutments 243 and 244 limiting such movement to from 0° to 80°. Upon movement of the condition lever to the 73° to 75° position, the detent enters the deeper recess 245 permitting of movement of the power lever over the range from +80° to −20°; and upon movement from 0° to −1°, the surface 246 engages the adjacent end of the detent to lock positively the condition lever in the landing or 73° to 75° position.

*Operation*

The apparatus described operates as follows: Pursuant to movement of the condition lever 36 from its 0° position incident to starting of the plant, such lever is moved further to the 60° position to adjust the setting of the speed regulator to bring the plant up to ground idling speed, whereupon the power lever 37 is released and is then movable over its range for take-off and for increase in rotational speed to the maximum rated speed, the latter being, for example, 12,700 R. P. M. with the power lever in its 80° position, operation of the power lever raising the torque and temperature regulator settings and further raising the speed regulator setting. For normal flight, the condition lever is set at 60° and the thrust is varied by operation of the power lever, that is, the turbine is operated at some speed less than the maximum except when maximum power is required and the reduction in speed is made consistent with the best fuel economy for the speed selected.

For combat operation, the condition lever 36 is moved further, for example, to the 73° to 75° position, to control the plant for about the top speed, namely, 12,700 R. P. M., of the turbine. This gives substantially constant or top speed for the range of movement of the power lever, movement of such lever changing the pitch to change the thrust, in consequence of which the action is quite rapid because the power is thereby increased and applied with very little change in turbine speed and therefore little, if any, acceleration.

For landing, the condition lever is set at the 73° to 75° position and the power lever is moved back toward the 0° position; and, as the plant is operating at the maximum speed fixed by the position of the condition lever, the thrust may be increased very rapidly in the event of waveoff because the rotational speed does not need to be changed to any substantial extent.

With the torque, temperature and speed network components supplied with electrical outputs respectively by the torquemeter, the thermocouple arrangement and the tachometer, such network components operate together as a regulating system or network controlling the power delivered by the turbine to the propeller by regulation of torque, temperature and speed to control the fuel input and propeller pitch. Such regulating network components, each have settings for raising and lowering the torque, temperature and speed, as the case may be, at which regulation occurs and the settings are operated by the condition and power levers.

Considering the torque network components, movement of the setting potentiometers raises or lowers the voltage at sliders 112 and 123 in consequence of which the potentials at grids "2" and "6" of the tubes, at 59 and 61, change relatively and the fuel control and pitch control motors are operated to change the fuel flow, and, therefore, the power delivered by the turbine to the propeller; however, movement of the motors moves the sliders to change the grid voltages in the opposite direction and the change in torque, pursuant to fuel change, changes the potential at the grids in such directions as to tend to move each of the motors in a direction opposite to that initiated by movement of the setting. Thus, the motors are operated in a follow-up manner to change the power delivered by the turbine to the propeller, the electric circuit being rebalanced with the fuel flow adjusted for zero torque change. In addition to the power setting, the torque network achieves a regulating function minimizing torque deviation for any given setting.

The magnitude of torque is shown by the indicator 101a operated by the motor 101. For zero torque change, the position of slider 98 depends on slider 95 of potentiometer 94. Assuming an increase in torque, the potential at slider 84 drops, thereby placing the motor 101 in operation to move the slider 98 to a potential point along the resistance having the potential of slider 84.

In connection with the described control of the potentiometers 111 and 122, it is to be understood that the circuit for potentiometer 111 has an altitude setting and that the circuit for the potentiometer 122 has a flight velocity setting so that the fuel flow is influenced by altitude and the propeller pitch by flight velocity. In general, pitch is influenced mainly by velocity and to some extent by altitude, while the contrary is true with respect to fuel.

The temperature network provides a potential which adds algebraically to torque output, the resultant going to the mid-point of the voltage divider, at 138, and being applied to the grids "2." Thus, increase in temperature, as will increase in torque, tends to decrease the fuel flow and propeller pitch.

The temperature control network includes two controls, one responsive to temperature and a setting, whereby the operating temperature may be increased as the speed and torque are raised, and the other, an over-temperature control, which comes into play if predetermined temperatures are exceeded in relation to predetermined speed setting or settings, the over-temperature control overcoming all other controls and restricting fuel input to limit increase in temperature.

Provision is made for pitch reversal of the propeller and manual control of the reverse pitch while having fuel control subject to torque, temperature and speed. This is accomplished by predetermined positioning of the condition and power levers and by initiating movement of the power lever from its 0° position. If the flight velocity does not exceed a predetermined amount, a switch will be operated to isolate the pitch control motor from the torque, temperature and speed control network and to subject it to manual control by means of such lever, the potentiometer then being connected into the circuit including the slider 206 of the potentiometer 208. Such slider is moved by the power lever to control movement of the pitch control motor.

The speed network receives, through a setting, tachometer output and operates to oppose change in speed, changing speed resulting in different potentials at the ends of the voltage divider and which potentials are imposed on the grids "2" of tubes, at 50 and 51, to cause opposite fuel control and pitch control actions, increasing speed being accompanied by decreasing fuel flow and increasing pitch. In addition to this corrective voltage, the speed network also provides a second corrective voltage in the same direction and whose value depends upon means movable in a direction determined by and at a speed depending upon the deviation of the controlling signal from its set value, whereby there is provided compensation to minimize deviation of turbine speed from the setting.

While increasing torque or temperature tends to decrease the fuel input and decrease the pitch, the apparatus correlates temperature and speed so that, while accelerating the engine up to "normal operation" of Fig. 8, the temperature is maintained as high as practicable and is increased as the rotational speed increases for the development of the power required at any speed without either the temperature or turbine torque exceeding the stall limit for the compressor.

Preferably the main control system is electrical and may assume a wide variety of forms, nevertheless, there is shown, by way of example, main control apparatus, at 32, of the electronic type constructed and arranged as hereinbefore described and utilizing the torque, speed and temperature inputs to provide outputs for controlling the fuel and the propeller pitch.

In the event of overspeeding of the plant to a predetermined extent, failure of the main control power supply, a predetermined over-temperature persisting for longer than a predetermined interval, or a predetermined loss of fuel pressure during take-off, there is provided a means responsive to any of these eventualities to shift automatic control of the plant from the main control system to the emergency control system, the pitch motor control being rendered ineffective to vary the pitch of the propeller blades, the by-pass valve of the speed controlled hydraulic arrangement for changing the propeller pitch being closed, and the shift valve 40 of the fuel control apparatus, at 26, being moved so that fuel entering such apparatus from the feed pump passes through the manual control valve 39 in the fuel-air ratio apparatus, at 41, and then goes through the dump valve and manifold to the atomizers.

To recapitulate briefly the mode of operation, servo-motors control the input of fuel for the turbine and the propeller pitch and each servo-motor is controlled by a vacuum tube having a pair of grids to which network voltages are applied. The network has torque, temperature and speed voltages applied thereto, it has torque, temperature and speed settings, and it has follow-up or feedback potentiometers operated by the servo-motors. The apparatus regulates for torque, temperature and speed, since deviation in these characteristics, and consequent unbalance of the network, is opposed by the effects of servo-motor operation, such operation continuing until the network is rebalanced. Since the change in torque influences the network immediately, the system is quite rapid in its response and stability is thereby promoted, control being primarily dependent upon torque with the temperature and speed influences coming in as corrective effects. The settings are controlled by condition and power levers. After starting, normally the condition lever is adjusted to bring the speed up to ground idle speed and thereafter, speed and power are increased by adjustment of the power lever. For combat or landing, the condition lever is adjusted further to bring the plant approximately up to full speed and the power lever is adjusted over its range to the extent required. With the condition lever in full speed position, a switch is thereby conditioned for switching control of the propeller pitch from the network to the power lever incident to reversal. The system includes a temperature override arrangement whose setting is automatically varied by the attained speed. Further, the main or automatic control system is interrelated to an emergency one in that, whenever required, changeover from the main to the emergency system is effected automatically.

While the invention has been shown in but one form, it will be obvious to those skilled in the art that it is not so limited, but is susceptible of various changes and modifications without departing from the spirit thereof.

What is claimed is:

1. In aircraft propulsion apparatus, the combination of, a propulsion gas turbine; a variable pitch propeller driven by the turbine by means of a driving connection; means connected with the turbine for supplying fuel for operation of the turbine; means providing electrical outputs in response to torque of the driving connection between the turbine and the propeller and in response to turbine speed and temperature; first, second, third and fourth vacuum tube means with said first and second vacuum tube means each including a pair of sets of tube elements and each set including a control grid; a normally-balanced controlling electrical network for the grids of said first and second tube means and including a voltage divider having its ends connected to a first grid of each of the first and second tube means, a speed bridge including said third vacuum tube means forming one of its impedance arms and having its output impressed across the resistance of the voltage divider, a temperature bridge including said fourth vacuum tube means forming one of its impedance arms and having its output impressed on the midpoint of the voltage divider, first and second potentiometers including sliders respectively connected to the second grids of the first and second tube means, means operatively connected with said fourth tube means for varying the impedance of the fourth tube means in response to changes in torque electrical output, means operatively connected with said fourth tube means for varying the impedance of the fourth tube means in response to changes in temperature electrical output, and means operatively connected with said third tube means for varying the impedance of the third tube means in response to changes in speed electrical output; motors operatively connected with and controlled in response to potential unbalance of the grids of the first and second tube means to vary the fuel input and the propeller pitch and to adjust the sliders of said potentiometers to rebalance the grid potentials; and manually-operable torque, speed and temperature settings for the network and adjustable to vary the torque, speed and temperature electrical output values for network balance.

2. In aircraft propulsion apparatus, the combination of, a propulsion gas turbine; a variable and reversible pitch propeller, a driving connection between the turbine and the propeller; means connected with the turbine for supplying fuel for operation of the turbine; means providing electrical outputs in response to torque of the driving connection between the turbine and the propeller and in response to turbine speed and temperature; first, second, third and fourth vacuum tube means with said first and second vacuum tube means each including a pair of sets of tube elements and each set including a control grid; a normally-balanced controlling electrical network for the grids of said first and second tube means and including a voltage divider having its ends connected to a first grid of each of the first and second tube means, a speed bridge including said third vacuum tube means forming one of its impedance arms and having its output impressed across the resistance of the voltage divider, a temperature bridge including said fourth vacuum tube means forming one of its impedance arms and having its output impressed on the midpoint of the voltage divider, first and second potentiometers including sliders respectively connected to the second grids of the first and second tube means, means operatively connected with said fourth tube means for varying the impedance of the fourth tube means in response to change in torque electrical output, means operatively connected with said fourth tube means for varying impedance of the fourth tube means in response to change in temperature electrical output, and means for varying the impedance of the third tube means in response to change in speed electrical output; motors operatively connected with the grids of said tube means and controlled in response to potential unbalance of the grids of the first and second tube means to vary the fuel input for the gas turbine and the propeller pitch and to adjust the sliders of said potentiometers to rebalance the grids; torque, speed and temperature settings for the network and adjustable to vary the torque, speed and temperature values for network balance; a circuit including variable impedance for applying voltage to said first grid of the second tube means; switch means operable to connect said first grid of said second tube means selectively to the network and to said circuit; and means manually movable over a forward and a reverse range for adjusting said torque, temperature and speed settings, for varying the impedance of said circuit, and for operating said switch means such that, in going from forward to reverse, the switch means is operated to transfer connection of said first grid of the second tube means from the network to said circuit for control by the latter to vary the extent of reverse pitch in accordance with adjustment of its impedance.

3. The combination as claimed in claim 2 with means operatively connected with said switch means and responsive to flight velocity to prevent operation of said switch means for reverse pitch operation if the flight velocity exceeds a predetermined amount.

CYRUS F. WOOD.
CARL L. SADLER, Jr.

References Cited in the file of this patent
UNITED STATES PATENTS

| Number | Name | Date |
|---|---|---|
| 2,187,120 | Gosslau et al. | Jan. 16, 1940 |
| 2,300,419 | Hammond, Jr. et al. | Nov. 3, 1942 |
| 2,306,953 | Jung | Dec. 29, 1942 |
| 2,322,303 | Martin | June 22, 1943 |
| 2,353,566 | Keller | July 11, 1944 |
| 2,442,049 | Lee, 2nd | May 25, 1948 |
| 2,453,651 | Mock | Nov. 29, 1948 |
| 2,457,595 | Orr, Jr. | Dec. 28, 1948 |
| 2,474,033 | Chamberlin et al. | June 21, 1949 |
| 2,479,813 | Chamberlin et al. | Aug. 23, 1949 |
| 2,485,431 | Chudyk | Oct. 18, 1949 |
| 2,492,472 | Fortescue | Dec. 27, 1949 |
| 2,505,796 | Sedille | May 2, 1950 |
| 2,508,260 | Holley, Jr. | May 16, 1950 |
| 2,521,244 | Moore, Jr. | Sept. 5, 1950 |
| 2,531,780 | Mock | Nov. 28, 1950 |
| 2,536,158 | Chamberlin et al. | Jan. 2, 1951 |
| 2,542,499 | Fortescue | Feb. 20, 1951 |
| 2,545,703 | Orr, Jr. | Mar. 20, 1951 |